United States Patent
Kleegrewe

(10) Patent No.: US 8,430,123 B2
(45) Date of Patent: Apr. 30, 2013

(54) POSITION REGULATOR

(75) Inventor: Thomas Kleegrewe, Minden (DE)

(73) Assignee: ABB Technology AG, Zürich (CH)

( * ) Notice: Subject to any disclaimer, the term of this patent is extended or adjusted under 35 U.S.C. 154(b) by 206 days.

(21) Appl. No.: 12/782,348

(22) Filed: May 18, 2010

(65) Prior Publication Data

US 2010/0294965 A1  Nov. 25, 2010

(30) Foreign Application Priority Data

May 19, 2009 (DE) .......................... 10 2009 021 918

(51) Int. Cl.
*E03B 7/07* (2006.01)
*F16K 37/00* (2006.01)
*F17D 3/00* (2006.01)

(52) U.S. Cl.
USPC .................. 137/554; 251/129.04; 251/129.01

(58) Field of Classification Search ............. 251/129.04, 251/129.01; 137/553, 554
See application file for complete search history.

(56) References Cited

U.S. PATENT DOCUMENTS

| | | | | |
|---|---|---|---|---|
| 5,109,675 A * | 5/1992 | Hwang | ........................... | 60/660 |
| 5,431,182 A * | 7/1995 | Brown | ............................ | 137/85 |
| 5,931,180 A * | 8/1999 | Nagasaka | ....................... | 137/85 |
| 6,512,960 B1 * | 1/2003 | Schulz | ............................ | 700/56 |
| 6,519,508 B1 * | 2/2003 | Saito | ............................. | 700/282 |
| 6,971,626 B2 * | 12/2005 | Seberger | .................. | 251/129.04 |
| 2004/0117102 A1 | 6/2004 | Weir et al. | | |
| 2005/0016176 A1 | 1/2005 | Griffiths et al. | | |
| 2006/0266966 A1 * | 11/2006 | Karte et al. | .............. | 251/129.04 |

FOREIGN PATENT DOCUMENTS

DE  60 2004 012 358 T2  1/2005
DE  10 2006 049 651 A1  4/2008

OTHER PUBLICATIONS

Operating Instruction for Electro-Pneumatic Positioner TZIDC, TZIDC-110, TZIDC-120, Document 42/18-84-EN, ABB, pp. 1-85.
German Office Action for DE 10 2009 021 918.8 dated Jan. 21, 2010.

* cited by examiner

*Primary Examiner* — John K Fristoe, Jr.
*Assistant Examiner* — Seth Faulb
(74) *Attorney, Agent, or Firm* — Buchanan Ingersoll & Rooney PC

(57) ABSTRACT

An exemplary position regulator is disclosed which includes a regulation unit and a travel measurement system for activating an actuating drive for adjusting a control fitting to a predetermined position. A signal shaper is provided for outputting a travel signal to a superordinate device. To provide an undisturbed output of the travel signal, the signal shaper is connected in series in a transmission path between the travel measurement system and the regulation unit, and is connected in parallel with the regulation unit so as to transmit signals. The signal shaper can have a switch which is controlled by an alarm signal of the regulation unit, by which, in a first (e.g., inoperative) position, the travel measurement system is fed from the regulation unit, and, in a second (e.g., operative) position, the travel measurement system is fed from the signal shaper. The signal shaper can be automatically calibrated when the position regulator is activated, by comparing an output signal from the travel measurement system with a travel signal which is received by the regulation unit.

4 Claims, 2 Drawing Sheets

POSITION REGULATOR

RELATED APPLICATIONS

This application claims priority under 35 U.S.C. §119 to German Patent Application No. 10 2009 021 918.8 filed in Germany on May 19, 2009, the entire content of which is hereby incorporated by reference in its entirety.

FIELD

The disclosure relates to a position regulator, such as a regulator having a travel measurement system for activating an actuating drive for adjusting a control fitting to a predetermined position.

BACKGROUND INFORMATION

Known actuating drives can be operated with, for example, hydraulic, pneumatic or electrical energy. A control fitting can be a valve or flap which is inserted into a pipeline and more or less allows or blocks the flow of a process medium through this pipeline as a function of a predefined setpoint value. To this end, the actual position of the control fitting can be determined with the aid of the travel measurement system and compared with a predefined setpoint value. The setpoint value can be provided by a superordinate device and electrically transmitted to the position regulator.

Operating instructions for an electropneumatic position regulator TZIDC from ABB, document 42/18-84-DE, issue 01.2009, disclose a known position regulator having a regulation unit, a travel measurement system and an electropneumatic converter having a signal shaper which is called an expansion module and which is connected to the regulation unit and is suitable for outputting the determined position via a separate communication connection. The signal shaper is separately fed via a conductor loop which also serves for communication with a superordinate device. The regulation unit provides the signal shaper with a travel signal which corresponds to the actual position of the control fitting. This travel signal is converted, in the signal shaper, into a conduction signal which can be transmitted to the conductor loop as a shaped (e.g. impressed, or superposed) current.

The travel signal is no longer available in the event of a disturbance in the regulation unit. Although an alarm level is received by the regulation unit and output to the conductor loop, the actual position of the control fitting is not available in the superordinate device.

DE 10 2006 049 651 A1 discloses redundantly supplying power to a position regulator from two electrical feeds in order to maintain the availability of the position regulator. Although this compensates for simple failures in the power supply and maintains operation of the position regulator as such, the transmission of setpoint values is also interrupted in position regulators which are connected to a two-wire line which serves both for feeding and communication for example, for transmitting the setpoint value via an impressed current, when feeding via this two-wire line fails.

The disclosures of the foregoing documents are incorporated herein by reference in their entireties.

SUMMARY

A position regulator is disclosed comprising a travel measurement system; a regulation unit; a signal shaper fed via a conductor loop and being configured for outputting a travel-proportional conduction signal via the conductor loop and for receiving an alarm signal when the regulation unit is disrupted; a transmission path by which the signal shaper is connected in series between the travel measurement system and the regulation unit, the signal shaper being connected in parallel with the regulation unit to transmit signals; and a switch of the signal shaper which is controlled by the alarm signal of the regulation unit, and having a first position wherein the travel measurement system is fed from the regulation unit, and having a second position wherein the travel measurement system is fed from the signal shaper, the signal shaper being automatically calibrated when the position regulator is activated by comparing an output signal from the travel measurement system with a travel signal which is received by the regulation unit.

BRIEF DESCRIPTION OF THE DRAWINGS

The disclosure will be explained in greater detail below with reference to exemplary embodiments. In the drawings.

DETAILED DESCRIPTION

Figure 1:
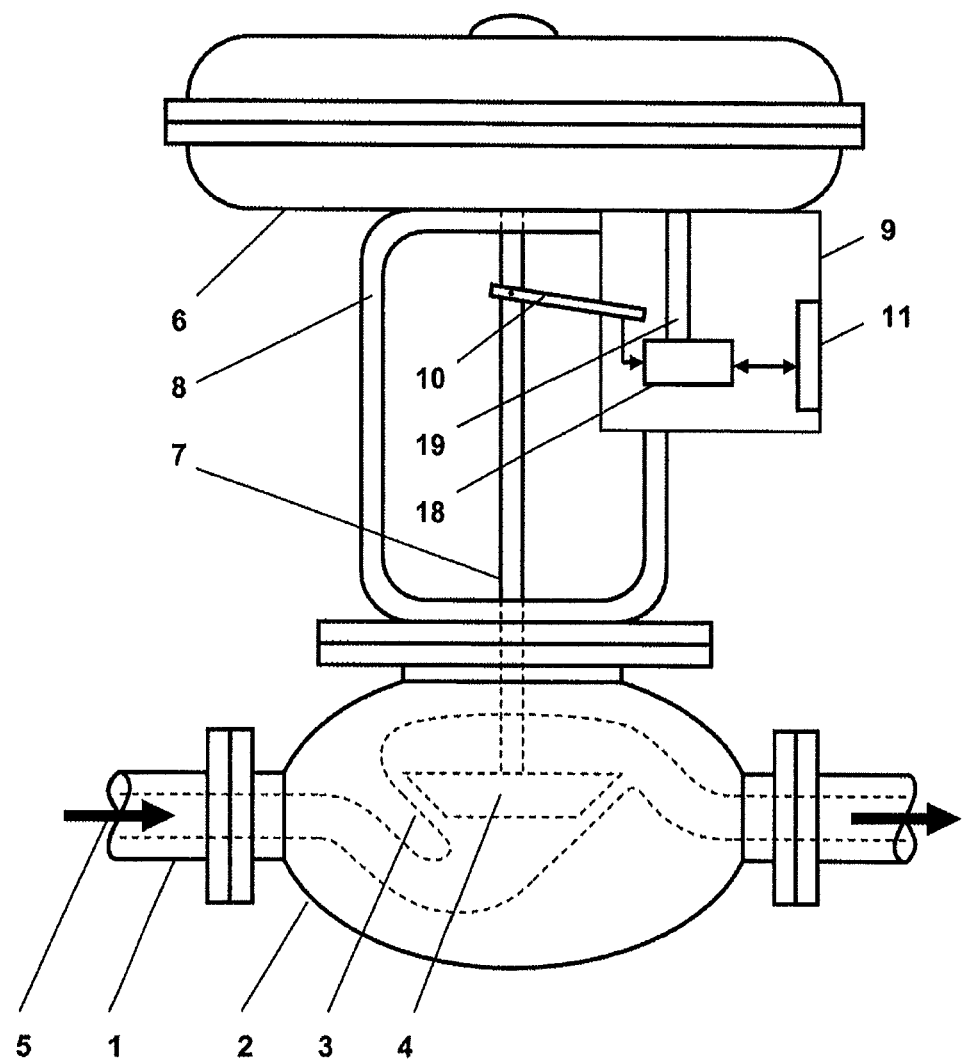
FIG. 1 shows an illustration of an exemplary actuating drive and a position regulator.

A position regulator having a travel measurement system is disclosed, in which a travel signal can be tapped off independently of disturbances in the regulation unit.

In an exemplary embodiment, a position regulator has a travel measurement system and a regulation unit to which a signal shaper is connected. The signal shaper is fed via a separate conductor loop. The signal shaper is suitable for outputting a travel-proportional conduction signal via this conductor loop, and for receiving an alarm signal when the regulation unit is disrupted.

According to an exemplary embodiment of the disclosure, the signal shaper can be connected in a transmission path between the travel measurement system and the regulation unit, and, in the process, connected in series with the travel measurement system and in parallel with the regulation unit so as to transmit signals. Furthermore, the signal shaper can include a switch which is controlled by an alarm signal of the regulation unit, and, in a first (e.g., inoperative) position, the travel measurement system is fed from the regulation unit, and, in a second (e.g., operative) position, the travel measurement system is fed from the signal shaper. The signal shaper can be automatically calibrated when the position regulator is activated, by comparing an output signal from the travel measurement system with a travel signal which is received by the regulation unit.

During undisturbed use in a desired manner, the switch can be in an inoperative position and the travel measurement system is fed from the regulation unit. An output signal from the travel measurement system can be simultaneously received by the regulation unit and the signal shaper as an actual value of a position of a control fitting driven by an actuating drive. In the regulation unit, an actual value of the position, can be compared, in a known manner, with an impressed (e.g., desired) setpoint value and a control signal can be generated from the difference, the control signal being applied to the actuating drive. Furthermore, the actual value can be conditioned in the regulation unit and output to the signal shaper.

During activation, the signal shaper receives the actual value of the position of the control fitting both indirectly and in conditioned form from the regulation unit and also directly from the travel measurement system as a raw signal. The signal shaper can be automatically calibrated by comparing the two actual values.

In the event of a disturbance in the regulation unit, the regulation unit outputs an alarm signal to the signal shaper. In response to this alarm signal, the switch can be moved to an operative position, with the result that the travel measurement system is now fed by the signal shaper. The actual value of the position of the control fitting can be transmitted from the already calibrated signal shaper, via the separate two-wire line, to the superordinate device.

The actual value of the position of the control fitting can, for example, remain available to the superordinate device during the occurrence of a disturbance in the regulation unit.

In accordance with an exemplary embodiment, the signal shaper can include a detector for monitoring the feeding of the travel measurement system, the detector being operatively connected to the switch. As soon as the detector identifies a disturbance in the feeding of the travel measurement system by the regulation unit, the switch can be moved from an inoperative position to an operative position, as a result of which the travel measurement system is now fed by the signal shaper.

FIG. 1 shows an exemplary pipeline 1, of which a fragment is indicated, of a process installation which has a process valve 2 installed in it as an actuating member. In its interior, the exemplary process valve 2 has a closure body 4, which interacts with a valve seat 3, in order to control the amount of process medium 5 passing through. The closure body 4 can be operated linearly via a lifting rod 7 by a pneumatic actuating drive 6 which is, for example, in the form of a linear drive. The actuating drive 6 can be connected to the process valve 2 via a yoke 8. A digital position regulator 9 is fitted to the yoke 8. The travel of the lifting rod 7 can be signaled to the position regulator 9 via a position sensor 10. The detected travel can be compared in a regulation unit 18 with the setpoint value which is supplied via a communication interface 11, and the actuating drive 6 can be operated as a function of the determined control deviation. The regulation unit 18 of the position regulator 9 operates an I/P converter for converting an electrical control deviation into an adequate control pressure (e.g., current I to pressure P conversion). The I/P converter of the position regulator 9 can be connected to the actuating drive 6 via, for example, a pressure medium supply 19.

Figure 2:
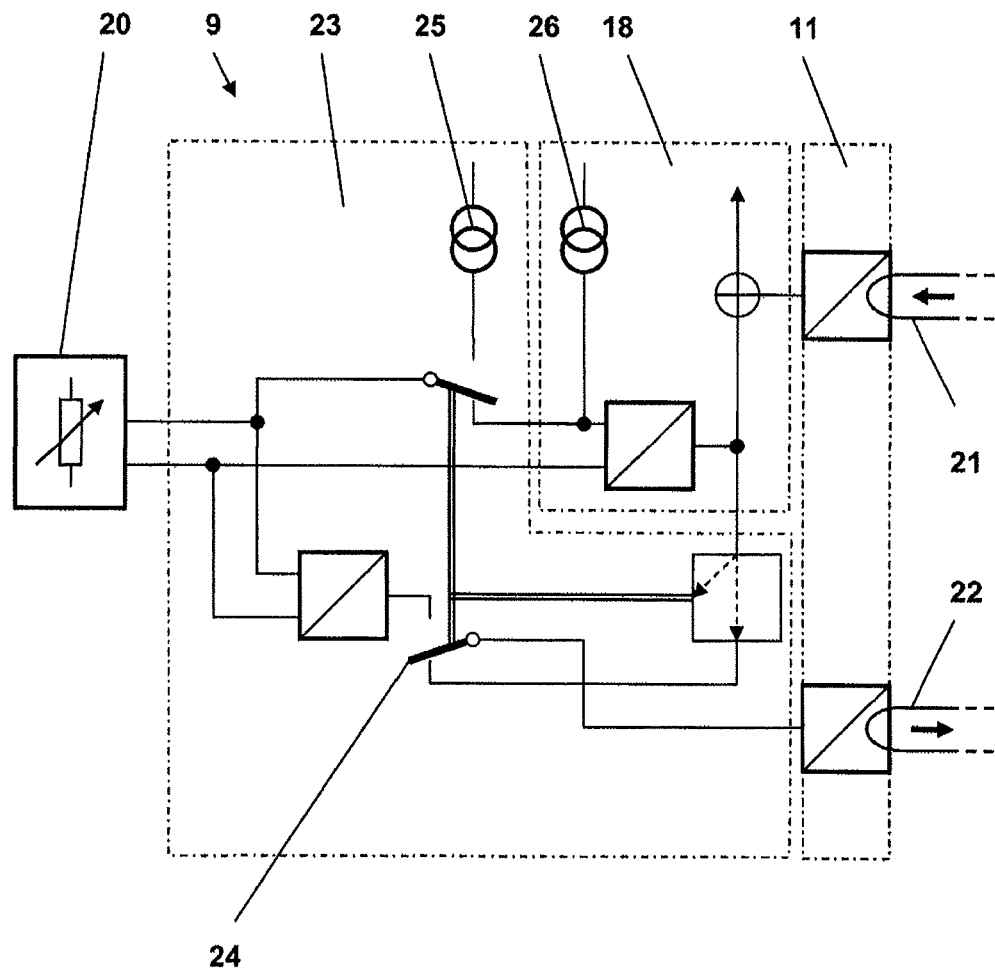
FIG. 2 shows a circuit diagram of an exemplary position regulator.

FIG. 2 shows an exemplary design of a position regulator 9. In the position regulator 9, a travel measurement system 20, which converts the mechanical travel information, which represents the position actual value of the process valve 2, of the position sensor 10 into an electrical signal, is connected to a regulation unit 18 which has means for feeding 26 the travel measurement system 20 and for conditioning signals. The setpoint value is supplied to the regulation unit 18 by means of a first conductor loop 21 via the communication interface 11. By comparing the setpoint value with the actual value, a control deviation is determined in a manner which is known per se, this control deviation being processed to form a control pressure in the pressure medium supply 19.

The regulation unit 18 is also connected to a signal shaper 23 to which the actual value of the position is supplied. The signal shaper 23 is connected to a second conductor loop 22 via the communication interface 11, the actual value of the position being output to a superordinate device, via said second conductor loop.

According to the disclosure, the signal shaper 23 is also connected in in the transmission path between the travel measurement system 20 and the regulation unit 18, and, in the process, is connected in series with the travel measurement system 20 and in parallel with the regulation unit 18 so as to transmit signals. The signal shaper 23 has a switch 24, and in a first (e.g., inoperative) position of the switch, which is shown in FIG. 2, the travel measurement system 20 is supplied with power from the feed 26 which is arranged in the regulation unit 18.

During activation of the position regulator 9, with the switch 24 in an inoperative position, the signal shaper 23 is automatically calibrated by comparing the output signal from the travel measurement system 20 with the travel signal which is received by the regulation unit 18.

In the event of a disturbance in the regulation unit 18, the regulation unit outputs an alarm signal to the signal shaper 23. In response to this alarm signal, the switch is moved to a second (e.g., operative) position independently of the type of disturbance in the switch 24. In this state, the travel measurement system 20 is now supplied with power by a feed 25 of the signal shaper 23. The energy for this purpose can be drawn from the second conductor loop 22. The actual value of the position of the control fitting can be transmitted from the already calibrated signal shaper 23, via the separate second conductor loop 22, to the superordinate device.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closure body
5 Process medium
6 Actuating drive
7 Valve rod
8 Yoke
9 Position regulator
10 Position sensor
11 Communication interface
18 Regulation unit
19 Pressure medium supply
20 Travel measurement system
21, 22 Conductor loop
23 Signal shaper
24 Switch
25, 26 Feed

What is claimed is:
1. A position regulator comprising:
a travel measurement system;
a regulation unit;
a signal shaper fed via a conductor loop and being configured for outputting a travel-proportional conduction signal via the conductor loop and for receiving an alarm signal when the regulation unit is disrupted;
a transmission path by which the signal shaper is connected between the travel measurement system and the regulation unit, the signal shaper being connected in series with the travel measurement system and in parallel with the regulation unit to transmit signals; and
a switch of the signal shaper which is controlled by the alarm signal of the regulation unit, and having a first position wherein the travel measurement system is fed from the regulation unit, and having a second position wherein the travel measurement system is fed from the signal shaper, the signal shaper being automatically calibrated when the position regulator is activated by comparing an output signal from the travel measurement system with a travel signal which is received by the regulation unit.

2. The position regulator as claimed in claim 1, wherein the signal shaper has a detector for monitoring a feed of the travel measurement system, said detector being operatively connected to the switch.

3. A valve actuator having an actuating drive and a position regulator connected to control the actuating drive, the position regulator comprising:
- a travel measurement system;
- a regulation unit;
- a signal shaper fed via a conductor loop and being configured for outputting a travel-proportional conduction signal and for receiving an alarm signal when the regulation unit is disrupted;

wherein
- a transmission path by which the signal shaper is connected to the travel measurement system and to the regulation unit; and
- a switch of the signal shaper which is controlled by the alarm signal of the regulation unit, and having a first position wherein the travel measurement system is fed from the regulation unit, and having a second position wherein the travel measurement system is fed from the signal shaper, the signal shaper being calibrated when the position regulator is activated by comparing an output signal from the travel measurement system with a travel signal which is received by the regulation unit.

4. The valve actuator as claimed in claim 3, wherein the signal shaper has a detector for monitoring a feed of the travel measurement system, said detector being operatively connected to the switch.

* * * * *